United States Patent [19]

Muller et al.

[11] 4,158,747

[45] Jun. 19, 1979

[54] ELECTROSTATIC TABLET WRITING STYLUS

[75] Inventors: Alex M. Muller; Joseph L. Tyrrell, both of Rancho Palos Verdes, Calif.

[73] Assignee: Telautograph Corporation, Los Angeles, Calif.

[21] Appl. No.: 919,264

[22] Filed: Jun. 26, 1978

[51] Int. Cl.[2] .................... G08C 21/00; H04N 1/00
[52] U.S. Cl. .............................. 178/19; 340/146.3 SY
[58] Field of Search .............................. 178/18, 19, 20; 340/146.3 SY, 324 R, 324 AD; 235/451; 324/72.5, 32, 158 P; 346/139 C

[56] References Cited

U.S. PATENT DOCUMENTS 4,034,155   7/1977   Muller et al. ............................ 178/19

Primary Examiner—Thomas A. Robinson
Attorney, Agent, or Firm—Freilich, Hornbaker, Wasserman, Rosen & Fernandez

[57] ABSTRACT

An improved device for capacitively detecting signals generated in a writing table by a grid of conductive wires that produce a varying electrostatic field near its surface to be picked up through a stack of paper with the table functioning as one plate of a capacitor, and a conductive stylus as the other plate. The improvement consists of grounding the stylus, which has an extended body portion surrounded by a tubular member, extending the tubular member to a point very near the stylus tip where it functions as the second plate of a capacitor, and connecting the tubular member to a preamplifier mounted in the device.

7 Claims, 4 Drawing Figures

ELECTROSTATIC TABLET WRITING STYLUS

BACKGROUND OF THE INVENTION

This invention relates to an improvement in a system for detecting and transmitting instant graphic information, such as cursive writing, as the graphic information is developed with a stylus on a table, and more particularly to an improvement in the stylus used to develop the graph and instantaneously pick up position signals for transmission to a receiver where the graph is reproduced in response to the signals.

In a typical system of this type, a grid of conductors embedded in a writing table are energized with very low pulse currents at distinct frequencies for the two axes, and distinct phase (time intervals) along each axis. This causes distinct electrostatic fields that vary in phase with position along the distinct axis. A tablet of paper placed on this table is used to develop the graphic information by an operator using a stylus which is designed to detect the electrostatic fields at all positions through which the stylus is moved on the tablet by the operator. Such a stylus is disclosed by the present inventors Alex Marcel Muller and Joseph Leslie Tyrrell, in U.S. Pat. No. 4,034,155. In that stylus, a ballpoint pen cartridge inside a pen housing is surrounded over a substantial portion of its length by a tubular member electrically shielded from the outside electrostatic field by the pen housing. Only the pen point is unshielded, and therefore exposed to the electrostatic field, to pick up position signals that are then conducted through the entire length of the pen cartridge and capacitively coupled into the tubular member. The latter is connected to a circuit contained within the housing for signal detection and preamplification.

Since the position signals must be capacitively coupled into the pen point, it has been found that the condition of the tablet directly under the pen point will affect the quality of the position signals picked up. As might be expected, the greater the number of sheets of paper in the tablet, the poorer the quality, but that has not presented any serious problem since it has been found that a stack ⅜" high of dry paper may be placed on the table and the stylus is still able to pick up detectable position signals. The problem has been when the paper is not dry due to absorption of moisture in the atmosphere while the tablets are in storage, transit or actual use. The quality of the signal that is detectable for a given stack height may become too undetectable for reliable transmission, depending upon the amount of moisture present in the paper. Accordingly, it is a general object of the present invention to improve the reliability of the signals detected for transmission from an electrostatic field table by a stylus.

SUMMARY OF THE INVENTION

In accordance with the present invention the reliability of a device of the type disclosed in the aforesaid U.S. Pat. No. 4,034,155 is improved by connecting the conductive stylus thereof to circuit ground, and providing a tubular member surrounding the stylus near the tip thereof. The tubular member is connected directly to means for amplifying the signal capacitively coupled into said tubular member.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
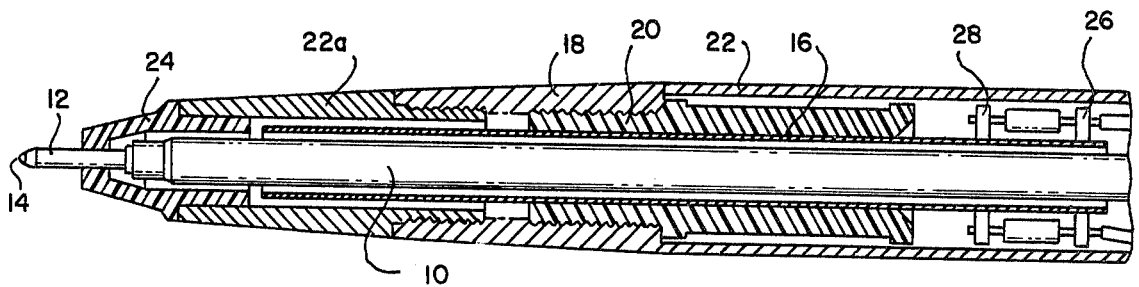
FIG. 1 is a sectional view of the writing-point end of the prior-art stylus.

Referring now to FIG. 1, the prior-art stylus is comprised of a ball-point pen cartridge 10 having a tip 12 of reduced diameter in the usual manner. The cartridge, including the reduced diameter end and its ball 14 at the tip, constitutes one continuous conductor that is surrounded by a tubular member 16 of conductive material. The tubular member is held in place by a plastic adapter nut 20 in a housing 22. The housing is made of conductive material, such as aluminum to shield the stylus. At the tip end of the housing, a section 22a is threaded on to permit replacement of the cartridge when it runs out of ink. A plastic bearing 24 holds the cartridge coaxially aligned with the tubular member and housing. Only the housing is connected to ground, as will be described more clearly with reference to FIG. 2. A circuit is mounted on and between printed-circuit boards 26 and 28 for preamplifying signals capacitively coupled to it from the cartridge 10 through the tubular member 16. The cartridge thus capacitively couples the amplifying circuit to the writing table by very small capacitance (typically 1 pf) through one or more sheets of paper. The cartridge 10 and tubular member 16 function as two plates of a very large capacitor (typically 10 $\mu\mu f$).

Figure 2:
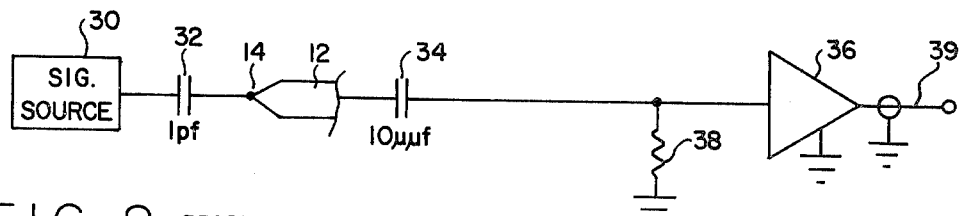
FIG. 2 is a diagram of the electrical circuit provided by the prior-art stylus.

FIG. 2 illustrates a schematic diagram of the electrical circuit provided by the stylus structure shown in FIG. 1. The tablet (not shown in FIG. 1) functions as a signal source 30, and paper on the tablet functions as a dielectric between the ball 14 at the pen tip 12 and the writing table to form a very small capacitor 32. The cartridge 10 and the tubular member 16 function as plates of a larger capacitor 34 (typically 10 $\mu\mu f$) connected to a preamplifier 36. A large resistor 38 biases the input terminal of the preamplifier to the housing of the stylus which functions as circuit ground for the preamplifier. The output of the preamplifier is then transmitted over a short coaxial cable 39 to a unit that supports the tablet and provides for detecting, shaping and power amplifying of the position signals for transmission to a receiver over a telephone line.

The improved stylus will now be described with reference to FIG. 3 which is drawn to a larger scale than FIG. 1, but is otherwise so similar that the same reference numerals are used for the directly corresponding parts. The improved stylus has a ball-point pen cartridge 10 grounded to the metal housing 22 by a short conductor 40. A metal extension 42 having a reduced diameter portion 42a slips over the tubular member 16 to extend the tubular member out to within a few millimeters (2 to 4 mm) of the pen tip. The plastic bearing 24 of FIG. 1 is divided into a portion 24a between the detachable end 22a of the housing and the extension 42, and a portion 24b between the reduced diameter portion 42a and the reduced diameter portion 12 of the cartridge 10. The tubular member 16 is connected to the preamplifier circuit as before.

Since the cartridge is grounded by the conductor 40, the pen tip which presses on the paper is not relied upon to pick up position signals. Instead, the extension 42 of the tubular member 16, and more particularly the reduced diameter portion 42a, is relied upon to pick up electrostatic signals from the table through the paper. The result is that the reliability of the signals picked up is greatly improved, particularly when sheets of paper contain moisture. If the sheets are oven dry, there is no improvement to be noticed since the signal is reliably good for both the old and the new stylus with dry paper. When the sheets have absorbed moisture, the quality of the signal deteriorates with the prior art-stylus, and the more sheets there are on the stack, the greater the deterioration in the quality of the signal, but for the present invention, the deterioration is not nearly so great as for the prior-art stylus. There is thus provided a significant improvement by the design of the new stylus.

The reason for this improvement, which has been experimentally verified, is not very clear. It is believed that the pressure at the tip of the ball point pen compresses the paper stack at the center of the ball, and if there is moisture, the moisture content per unit volume under the center of the ball goes up, thus decreasing the capacitive coupling from the table to the cartridge significantly. In the area surrounding the center of the tip, the paper compression is not nearly so great, and so the capacitive coupling is not reduced nearly so much. That, plus the larger area presented by the end of the reduced diameter portion 42a of the extension 42 to the tubular member 16 as a second plate of a capacitor, increases the capacitive coupling for the position signal from the table to the stylus.

Figure 3:
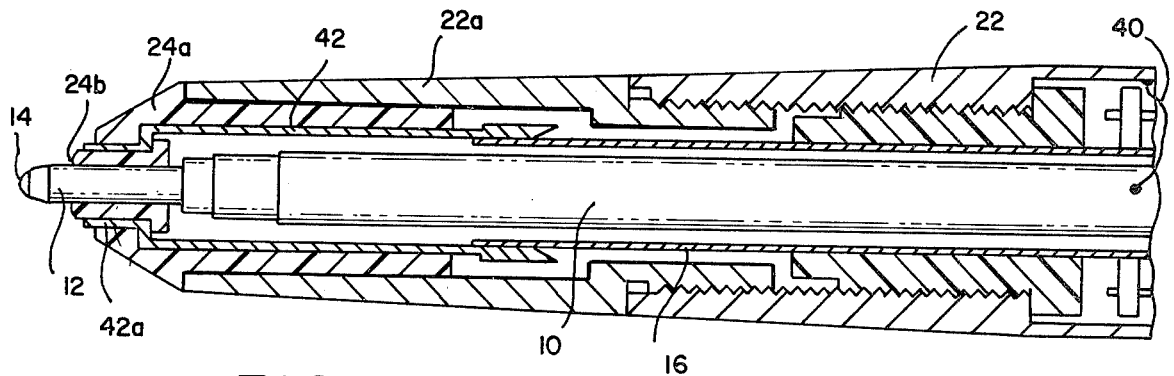
FIG. 3 is a sectional view of the improved stylus of the present invention.
Figure 4:
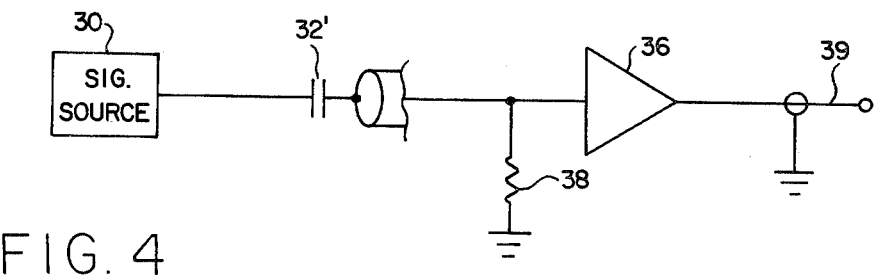
FIG. 4 is a diagram of the electrical circuit provided by the present invention.

FIG. 4 shows a schematic diagram of the electrical circuit provided by the improved stylus structure of FIG. 3, wherein the same reference numerals are used as in FIG. 2 for the corresponding parts. Here the capacitance 32' coupling the stylus to the signal source (table) is provided by the end of the tubular member extension, and the tubular member is connected directly to the preamplifier 36 which has its circuit ground connected to the outer conductor of the coaxial cable 39. That outer conductor is connected to the conductive housing 22.

The optimum use of this stylus would seem to call for it to be held by the operator perpendicular to the tablet while writing or drawing a graph, but experience has shown that the stylus may be held at an angle, as is customarily done while writing, without affecting the fidelity of the facsimile recorded by a receiver, provided the angle is maintained substantially constant. The reason for this is believed to be that only the coupling capacitance 32' is affected by tilting the stylus. However, since that capacitance is increased on one half side and decreased on the other half side of the annular end of the reduced diameter portion 42a of the extension 42 of the tubular member 16, the total capacitance is a substantially constant average for the position signals at the position of the ball 14 on the tablet.

Although a particular embodiment of the invention has been described and illustrated herein, it is recognized that modifications and variations may readily occur to those skilled in the art. For example, instead of using a tubular member extending from the tip to the circuit board 26 for the preamplifier, it would be possible to use a short tubular member or ring of a length approximately equal to the portion 42a, and to connect that ring to the preamplifier through an insulated wire, but it is preferred to use the construction shown for greater structural stability of the entire assembly. It is therefore intended that the claims be interpreted to cover such modifications and variations.

What is claimed is:

1. A device for sensing a dynamic electrostatic field through a tablet of paper on a writing table comprising
    a stylus of conductive material having an extended body portion and tip for writing on said tablet,
    a tubular member of conductive material surrounding said stylus over at least a portion thereof near said tip and insulated therefrom,
    amplifying means directly connected to said tubular member, and
    means for connecting said stylus to ground reference potential for said amplifying means.

2. A device as defined in claim 1 wherein said stylus is a cartridge for a ball point pen.

3. A device as defined in claim 2 including a housing for said stylus and tubular member.

4. A device as defined in claim 3 wherein said housing is made of conductive material, is electrically connected to said stylus and is insulated from said tubular member.

5. A device for sensing a dynamic electrostatic field through a tablet of paper on a writing table comprising
    a stylus of conductive material having an extended body portion and tip for writing on said tablet,
    a tubular member of conductive material surrounding said stylus and insulated therefrom, said tubular member having a portion extending to a position very near said stylus tip, said extended portion being coaxial with said tip and insulated therefrom,
    a housing of conductive material enclosing a substantial portion of said stylus and surrounding tubular member,
    amplifying means directly connected to said tubular member, and
    means for connecting said stylus to circuit ground for said amplifying means, whereby said tubular member capacitively couples directly to said amplifying means an electrical signal corresponding to said dynamic electrostatic field.

6. A device as defined in claim 5 wherein said stylus is an ink cartridge for a ball point pen, wherein said cartridge and said ball point are metal, and said extended portion of said tubular member extends to a position near said ball point sufficient to capacitively couple an electrical signal from said table through said tablet without contracting said paper while said stylus is in use at any writing angle.

7. In a device for capacitively coupling into an amplifier signals generated in a writing table by a grid of conductive wires that produce a varying electrostatic field near its surface while said device is in use for writing on a tablet on said table, said table functioning as one plate of a capacitor, and a conductive stylus in said device functioning as the other plate of said capacitor, the improvement comprising means for grounding said stylus, thereby to remove it from the capacitive coupling circuit, and providing a tubular member of conductive material near the writing tip of said stylus, said tubular member being coaxial with said tip and insulated therefrom, and means for directly connecting said tubular member to said amplifier.

* * * * *